US012710718B2

(12) United States Patent
Takeuchi

(10) Patent No.: US 12,710,718 B2
(45) Date of Patent: Aug. 18, 2026

(54) IMAGE FORMING APPARATUS INCLUDING SHEET DISCHARGE UNIT

(71) Applicant: CANON KABUSHIKI KAISHA, Tokyo (JP)

(72) Inventor: Masaaki Takeuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/973,568

(22) Filed: Dec. 9, 2024

(65) Prior Publication Data

US 2025/0199448 A1 Jun. 19, 2025

(30) Foreign Application Priority Data

Dec. 19, 2023 (JP) ................................ 2023-214288

(51) Int. Cl.

| | |
|---|---|
| ***G03G 15/00*** | (2006.01) |
| ***G03G 21/16*** | (2006.01) |
| ***H04N 1/00*** | (2006.01) |

(52) U.S. Cl.

CPC ..... *G03G 15/6552* (2013.01); *G03G 21/1633* (2013.01); *G03G 21/1647* (2013.01); *H04N 1/00535* (2013.01); *H04N 1/00551* (2013.01); *H04N 1/00557* (2013.01); *G03G 2215/00717* (2013.01)

(58) Field of Classification Search

CPC ..... G03G 15/6552; G03G 2215/00717; G03G 21/1633; G03G 21/1647; H04N 1/00535; H04N 1/00557

See application file for complete search history.

(56) References Cited

U.S. PATENT DOCUMENTS 7,226,050 B2 * 6/2007 Sekiyama .............. B65H 31/00 399/361
2001/0031162 A1 * 10/2001 Koshimizu ........ H04N 1/00567 399/405

(Continued)

FOREIGN PATENT DOCUMENTS

JP H02296260 A 12/1990
JP 09-301602 A * 11/1997

(Continued)

OTHER PUBLICATIONS

English translation of JP 2016-194543 A; published on Nov. 17, 2016 (Year: 2016).*

(Continued)

*Primary Examiner* — Sophia S Chen

(74) *Attorney, Agent, or Firm* — ROSSI, KIMMS & McDOWELL LLP

(57) ABSTRACT

An image forming apparatus includes an apparatus body accommodating an image forming unit, an image reading unit disposed above the apparatus body and including an opening/closing member, and a sheet discharge unit disposed above the apparatus body and including a discharge tray configured to support a discharged sheet. The discharge tray is disposed above the opening/closing member, movable to a first position and to a second position above the first position, and configured to move from the first position to the second position when the opening/closing member is moved from the closed position to the open position.

20 Claims, 8 Drawing Sheets

(56) References Cited

U.S. PATENT DOCUMENTS

| | | | | |
|---|---|---|---|---|
| 2018/0093505 | A1 | 4/2018 | Hirata et al. | |
| 2018/0093845 | A1 | 4/2018 | Hirata et al. | |
| 2018/0265321 | A1* | 9/2018 | Sato | G03G 15/6552 |

FOREIGN PATENT DOCUMENTS

| | | | |
|---|---|---|---|
| JP | 2014192591 | A | 10/2014 |
| JP | 2016194543 | A | 11/2016 |
| JP | 2018052727 | A | 4/2018 |
| JP | 2021121567 | A | 8/2021 |

OTHER PUBLICATIONS

English translation of JP 2016-194543; published on Nov. 17, 2016 (Year: 2016).*

* cited by examiner

FIG.7

Comparative Example

IMAGE FORMING APPARATUS INCLUDING SHEET DISCHARGE UNIT

BACKGROUND OF THE INVENTION

Field of the Invention

The present invention relates to image forming apparatuses for forming images on sheets.

Description of the Related Art

Japanese Patent Application Laid-Open Publication No. 2021-121567 discloses a configuration of an image forming apparatus in which a scanner unit and an option unit, i.e., sheet discharge unit, are disposed above an apparatus body of the image forming apparatus and an opening/closing cover of an image reading unit is disposed below a lowermost tray of the option unit.

According to the document described above, the lowermost tray of the option unit is disposed above a position of the opening/closing cover in the opened state.

SUMMARY OF THE INVENTION

The present disclosure provides an image forming apparatus that can be downsized in an up-down direction.

According to an aspect of the disclosure, an image forming apparatus includes an apparatus body accommodating an image forming unit configured to form an image on a sheet, an image reading unit disposed above the apparatus body and configured to read an image information, the image reading unit including an opening/closing member movable to a closed position and to an open position above the closed position, and a sheet discharge unit disposed above the apparatus body and configured to discharge a sheet on which an image has been formed by the image forming unit, the sheet discharge unit including a discharge tray configured to support a discharged sheet, the discharge tray being disposed above the opening/closing member, movable to a first position and to a second position above the first position, and configured to move from the first position to the second position when the opening/closing member is moved from the closed position to the open position.

According to another aspect of the disclosure, an image forming apparatus includes an apparatus body accommodating an image forming unit configured to form an image on a sheet, the apparatus body including an opening/closing member movable to a closed position and to an open position above the closed position, and a sheet discharge unit disposed above the apparatus body and configured to discharge a sheet on which an image has been formed by the image forming unit, the sheet discharge unit including a discharge tray configured to support a discharged sheet, the discharge tray being disposed above the opening/closing member, movable to a first position and to a second position above the first position, and configured to move from the first position to the second position when the opening/closing member is moved from the closed position to the open position.

Further features of the present invention will become apparent from the following description of exemplary embodiments with reference to the attached drawings.

BRIEF DESCRIPTION OF THE DRAWINGS

FIG. 7 is a schematic drawing of an image forming apparatus according to a comparative example.

DESCRIPTION OF THE EMBODIMENTS

Figure 1:
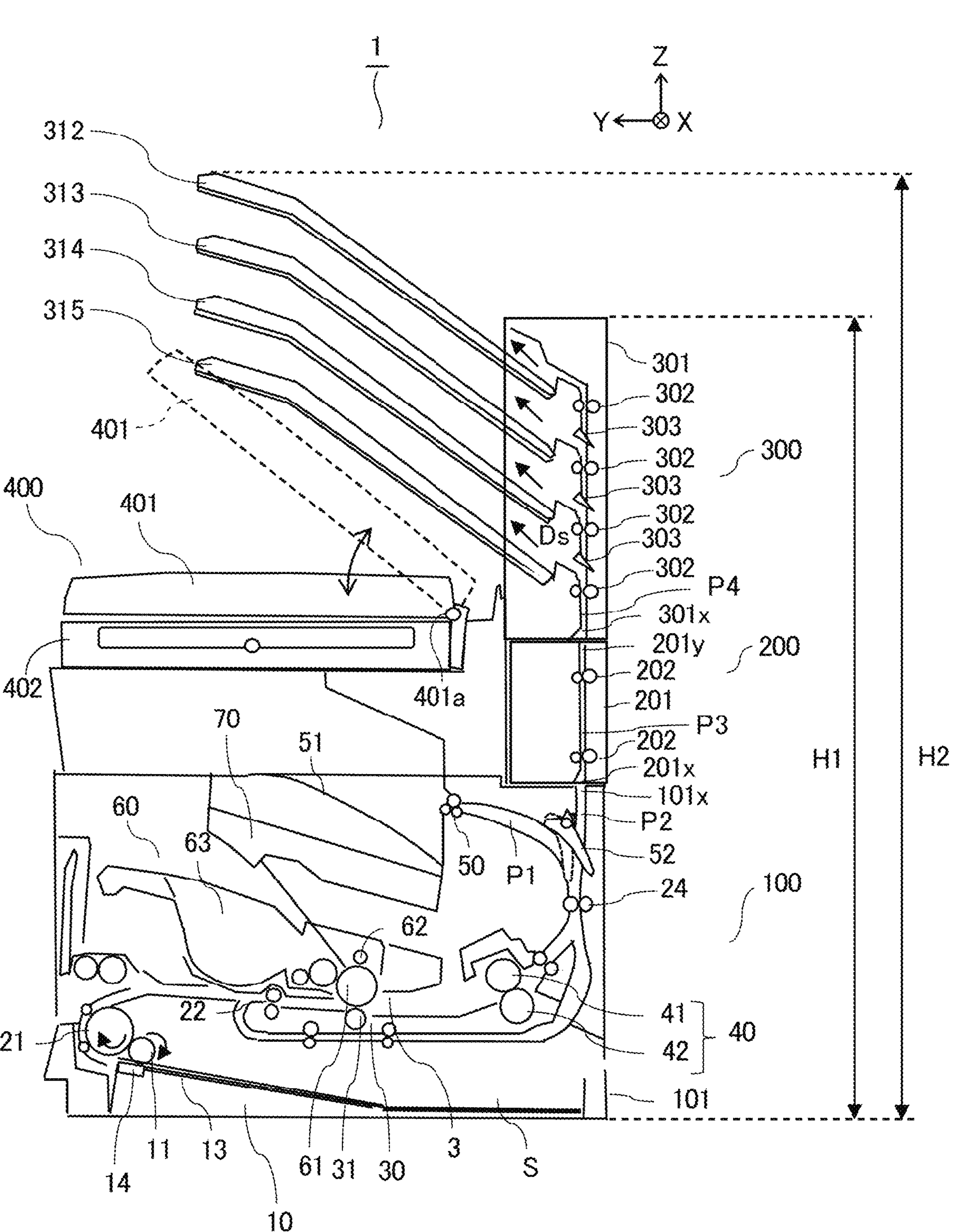
FIG. 1 is a schematic drawing of an image forming apparatus according to a first embodiment.

Embodiments according to the present disclosure will be described below with reference to the drawings.

First Embodiment

One embodiment (first embodiment) will be described. In the following description and drawings, a vertical direction, i.e., gravity direction, in a state where an image forming apparatus 1 is placed on a horizontal surface is referred to as a Z axis direction. A direction of a rotational axis of a photosensitive drum, i.e., image bearing member, disposed in the image forming apparatus 1 is referred to as an X axis direction. A direction that intersects both the Z axis direction and the X axis direction is referred to as a Y axis direction. The X axis direction, the Y axis direction, and the Z axis direction are preferably mutually orthogonal.

Regarding the directions along each coordinate axis, a positive direction and a negative direction are denoted, as needed, by adding a + sign or a – sign thereto. For example, a positive direction of the X axis, i.e., direction denoted by arrow X in the drawing, is referred to as a +X side, and a negative direction of the X axis, i.e., opposite direction of arrow X, is referred to as a –X side.

Outline of Image Forming Apparatus

At first, an outline of the image forming apparatus 1 according to the first embodiment will be described with reference to FIG. 1. FIG. 1 is a schematic drawing of the image forming apparatus 1.

The image forming apparatus 1 includes an image forming apparatus body 100, i.e., apparatus body, an intermediate unit 200, a sheet discharge unit 300, and an image reading unit 400. The intermediate unit 200, the sheet discharge unit 300, and the image reading unit 400 are disposed above the image forming apparatus body 100. According to the present embodiment, the intermediate unit 200 and the image reading unit 400 are supported on an upper surface portion of the image forming apparatus body 100 in a state aligned along the Y axis direction, and the sheet discharge unit 300 is supported on an upper surface portion of the intermediate unit 200.

The image forming apparatus 1 forms an image on a sheet S, i.e., recording material, in the image forming apparatus body 100 based on an image information read from a sheet, hereinafter referred to as a document, for example by the image reading unit 400. Various sheet materials of different sizes and materials may be used as the sheet S serving as a recording material, i.e., recording medium, such as paper including normal paper and thick paper, sheet materials such as coated paper subjected to surface treatments, sheet materials such as envelopes and index paper having special shapes, plastic films, and cloths.

The image forming apparatus body 100 may be used alone by itself as an image forming apparatus, i.e., printer, for forming images on sheets S. That is, each of the intermediate unit 200, the sheet discharge unit 300, and the image reading unit 400 may be an option unit that is detachably attached to the image forming apparatus body 100. The sheet discharge unit 300 may also be referred to as a discharge option unit, an extension discharge tray, or a mailbox. Further, the sheet discharge unit 300 may have a function as a sheet processing apparatus, i.e., finisher, equipped with a processing unit for binding or punching the sheets S.

The image forming apparatus body 100, i.e., apparatus body, accommodates an image forming portion 3 serving as an image forming unit. Specifically, the image forming apparatus body 100 according to the present embodiment includes a casing, hereinafter referred to as a main body casing 101, the image forming portion 3 accommodated in the main body casing 101, a sheet feeding apparatus 10 for feeding the sheet S toward the image forming portion 3, and a fixing unit 40 for fixing an image on the sheet S. The image forming portion 3 according to the present embodiment is configured to form an image on the sheet S by an electrophotographic system.

The image forming portion 3 includes a photosensitive drum 61, a charging roller 62, a laser scanner 70, a developing unit 63, and a transfer roller 31. The photosensitive drum 61 includes a photosensitive layer formed of an organic photosensitive material, and it is formed into a drum shape, or cylinder shape. The photosensitive drum 61 functions as an image bearing member that bears an electrostatic latent image and a toner image. The charging roller 62 functions as a charging unit that charges a surface of the photosensitive drum 61. The laser scanner 70 functions as an exposing unit that irradiates light to the photosensitive drum 61 and carries out an exposure process. An LED exposing unit that uses LED as a light source may be used as the exposing unit. The developing unit 63 includes a storage portion for storing toner serving as a developer, and a developing roller, i.e., developer bearing member, for bearing the developer and supplying the same to the photosensitive drum 61. The transfer roller 31 functions as a transfer unit for transferring the toner image from the photosensitive drum 61 to the sheet S. The transfer roller 31 abuts against the photosensitive drum 61 and forms a transfer portion 30, i.e., transfer nip, with the photosensitive drum 61 for transferring the toner image.

A part or the entirety of the image forming portion 3 may be formed as a cartridge that is integrally attachable/detachable to the main body casing 101. In the present embodiment, the photosensitive drum 61, the charging roller 62, and the developing unit 63 constitute a process cartridge 60 that is integrally attachable/detachable to the frame body of the image forming apparatus body 100.

The sheet feeding apparatus 10 includes a supporting plate 13 that supports a bundle of sheet S being supported thereon, a feed roller 11 arranged above the supporting plate 13, and a separation pad 14 abutted against the feed roller 11. The supporting plate 13 may be a part of a sheet storage, i.e., cassette or tray, that is attached in a drawable manner to the main body casing 101. The feed roller 11 functions as a feeding member for feeding the sheets S. The separation pad 14 forms a separation nip with the feed roller 11, and performs separation of the S by providing a frictional force to the sheet S at the separation nip and preventing the sheets S other than the uppermost sheet S that is abutted against the feed roller 11 from passing through the separation nip. The separation pad 14 is an example of a separation member for separating the sheet S, and for example, a roller member connected through a torque limiter to a fixed shaft that does not rotate may be adopted as the separation member.

The fixing unit 40 includes a fixing roller 41, a pressure roller 42, and a heat source that heats the fixing roller 41. The pressure roller 42 is in pressure contact with the fixing roller 41, and a fixing nip is formed between the fixing roller 41 and the pressure roller 42. A halogen lamp or a coil unit for induction heating may be adopted as the heat source.

The image forming apparatus body 100 includes a discharge roller pair 50 and a switching member 52. The switching member 52 is a guide that switches a conveyance path of the sheet S that has passed through the fixing unit 40 between a conveyance path P1 leading to the discharge roller pair 50 and a conveyance path P2 leading to the intermediate unit 200 and the sheet discharge unit 300. The discharge roller pair 50 functions as a discharge unit that discharges the sheet S on which an image has been formed at the image forming portion 3 onto a discharge tray 51 disposed on the main body casing 101.

An opening, i.e., discharge port 101*x*, through which the sheet S is discharged toward the intermediate unit 200 is provided on the upper surface portion of the main body casing 101. In the present embodiment, the sheet S is discharged approximately upward through the discharge port 101*x*.

The intermediate unit 200 is detachably attached to the upper surface portion of the main body casing 101. The intermediate unit 200 includes a casing, hereinafter referred to as an intermediate casing 201, and one or more conveyance rollers 202 that are arranged within the intermediate casing 201. A lower surface portion of the intermediate casing 201 is opposed to the upper surface portion of the main body casing 101.

An opening, i.e., an intake port 201*x*, through which the sheet S discharged through the discharge port 101*x* of the image forming apparatus body 100 is received is provided on the lower surface portion of the intermediate casing 201. An opening, i.e., a discharge port 201*y*, through which the sheet S is discharged toward the sheet discharge unit 300 is provided on an upper surface portion of the intermediate casing 201. Further, a conveyance path P3 communicated from the intake port 201*x* to the discharge port 201*y* is formed within the intermediate casing 201.

The sheet discharge unit 300 is detachably attached to the upper surface portion of the intermediate casing 201. That is, the sheet discharge unit 300 is detachably attached to the upper portion of the image forming apparatus body 100 through the intermediate casing 201. The sheet discharge unit 300 is configured to discharge the sheet on which the image has been formed in the image forming apparatus body 100 to any one of discharge trays 312 to 315.

The sheet discharge unit 300 includes a casing, hereinafter referred to as a discharge casing 301, one or more conveyance rollers 302 and one or more switching members 303 arranged within the discharge casing 301, and one or more discharge trays 312 to 315 supported on the discharge casing 301. When the sheet discharge unit 300 is adopted, it may become possible to assign respective discharge trays 312 to 315 to specific users, manage the sheets S to which a specific image has been formed more efficiently, or increase the capacity of discharge of the sheet S of the entire image forming apparatus 1.

The sheet discharge unit 300 according to the present embodiment includes, as the plurality of discharge trays, the four discharge trays 312 to 315 aligned in the Z axis direction. Further, the sheet discharge unit 300 includes four conveyance rollers 302, i.e., four sets of conveyance roller pairs, that correspond to the four discharge trays 312 to 315. Each of the conveyance rollers 302 function as a discharge member that discharges the sheet S toward the corresponding discharge trays 312 to 315.

The four discharge trays 312 to 315 are positioned above an opening/closing cover 401 of the image reading unit 400 described below. In a state where the opening/closing cover 401 is positioned at a closed position, when viewed in the Z axis direction, i.e., gravity direction, each of the discharge trays 312 to 315 overlap with the opening/closing cover 401. Furthermore, a lower surface of the lowermost discharge tray 315 opposes to an upper surface of the opening/closing cover 401 in the Z axis direction.

A lower surface portion of the discharge casing 301 is opposed to the upper surface portion of the intermediate casing 201. An opening, i.e., inlet port 301*x*, that receives the sheet S discharged through the discharge port 201*y* of the intermediate unit 200 is provided on the lower surface portion of the discharge casing 301.

The image reading unit 400 is detachably attached to the upper surface portion of the main body casing 101. The image reading unit 400 is aligned in the Y axis direction with the intermediate unit 200 at the upper surface portion of the main body casing 101. The image reading unit 400 is positioned on the +Y side with respect to the intermediate unit 200.

The image reading unit 400 includes a reading main body 402 supported on the upper surface portion of the main body casing 101, and the opening/closing cover 401 supported on the reading main body 402. The opening/closing cover 401 is an example of an opening/closing member that is disposed on the upper surface portion of the image reading unit 400, the opening/closing member movable between a closed position and an open position above the closed position.

The opening/closing cover 401 according to the present embodiment is movable about a rotation shaft 401*a*, i.e., hinge portion, between the open position, i.e., dotted line position, and the closed position, i.e., solid line position. The direction of the rotation shaft 401*a* of the opening/closing cover 401 is a direction intersecting both a discharge direction Ds (FIGS. 2A and 2B) toward which the sheet S is discharged onto the lowermost discharge tray 315 of the sheet discharge unit 300 described later and the gravity direction, i.e., Z axis direction. In the present embodiment, the rotation shaft 401*a* of the opening/closing cover 401 is approximately parallel to the X axis direction.

In a state where the opening/closing cover 401 is in the closed position, the rotation shaft 401*a* is disposed on an end portion on a −Y side of the opening/closing cover 401. Further, the discharge direction Ds of the sheet S with respect to the discharge tray 315 is a direction from the −Y side toward the +Y side in the Y axis direction. Therefore, the user may access the opening/closing cover 401 and the discharge tray 315 from the +Y side of the image forming apparatus 1 and perform an opening and closing operation of the opening/closing cover 401 or to remove the sheet S from the discharge tray 315. In the following description, the +Y side may be referred to as a “front side” and a −Y side may be referred to as a “rear side”.

In the present embodiment, the sheet S conveyed from the image forming apparatus body 100 to the sheet discharge unit 300 is conveyed via the intermediate unit 200, which is a unit that is different from the sheet discharge unit 300. However, the sheet discharge unit 300 may also be directly connected to the image forming apparatus body 100. Specifically, a configuration may be adopted in which the lower surface portion of the discharge casing 301 is supported on the upper surface portion of the main body casing 101, and the inlet port 301*x* of the discharge casing 301 is communicated with the discharge port 101*x* of the main body casing 101.

Operation of Image Forming Apparatus

Next, a series of operations, i.e., image forming operations, in which the image forming apparatus 1 conveys the sheet S while forming an image on the sheet will be described. In the image forming operation, the photosensitive drum 61 is driven to rotate, and the charging roller 62 charges the surface of the photosensitive drum 61 uniformly. The laser scanner 70 exposes the photosensitive drum 61 based on an image information received from an external computer or an image information read by the image reading unit 400, and forms an electrostatic latent image on the surface of the photosensitive drum 61. The developing unit 63 develops the electrostatic latent image into a toner image using toner.

Meanwhile, the feed roller 11 starts to rotate at a predetermined timing. Since a leading edge portion of the sheet S supported on the supporting plate 13 is in pressure contact with the feed roller 11 with a predetermined force, the sheet S is fed by receiving frictional force from the feed roller 11 being rotated. Further, the feed roller 11 is controlled to rotate in a clockwise direction in the drawing only when feeding sheets. If multiple sheets S on the supporting plate 13 are sent out simultaneously, only the uppermost sheet S is separated from the other sheets S by the separation pad 14 and conveyed.

The sheet S fed by the feed roller 11 is conveyed via a conveyance roller 21 and a registration roller pair 22 to the transfer portion 30. By having a predetermined voltage applied to the transfer roller 31 at the transfer portion 30, the toner image formed on the photosensitive drum 61 is electrostatically drawn toward the transfer roller 31, and a toner image is transferred to the sheet S. The sheet S having passed through the transfer portion 30 is conveyed to the fixing unit 40. The fixing unit 40 nips and conveys the sheet S by the fixing roller 41 and the pressure roller 42 while heating and pressing the toner image on the sheet S. Thereby, an image is fixed to the sheet S.

The sheet S having passed through the fixing unit 40 is further conveyed by a conveyance roller pair 24 and guided to either one of the conveyance paths P1 and P2 by the switching member 52. When discharging the sheet S onto the discharge tray 51 of the image forming apparatus body 100, the sheet S is guided to the discharge roller pair 50 by the switching member 52 positioned at the solid line position in the drawing, and discharged onto the discharge tray 51 by the discharge roller pair 50.

When discharging the sheet S onto the discharge trays 312 to 315 of the sheet discharge unit 300, the sheet S is guided to the conveyance path P2 by the switching member 52 positioned at the broken line position in the drawing. The sheet S guided to the conveyance path P2 passes through the discharge port 101*x* of the main body casing 101 and is discharged from the image forming apparatus body 100.

The sheet S discharged from the image forming apparatus body 100 is passed through the intake port 201*x* of the intermediate unit 200 and taken into the conveyance path P3 within the intermediate unit 200, and conveyed by the conveyance roller 202. Further, the sheet S is passed through the discharge port 201$y$ and discharged from the intermediate unit 200, passed through the inlet port 301$x$ of the sheet discharge unit 300, and taken into a conveyance path P4 within the sheet discharge unit 300.

The sheet S is conveyed through the conveyance path P4 by the conveyance rollers 302, and guided by the switching members 303 into one of the discharge trays 312 to 315. Each switching member 303 is movable to a position for guiding the sheet S to the corresponding discharge tray and to a position for guiding the sheet S so that the sheet S may be discharged to an upper discharge tray that is positioned above the corresponding discharge tray. For example, the switching member 303 corresponding to the lowermost discharge tray 315 is movable to a position for guiding the sheet S to the discharge tray 315 and to a position for guiding the sheet S to proceed on the conveyance path P4 such that the sheet S is moved toward discharge trays 312 to 314 above the discharge tray 315. The sheet S is discharged by the conveyance rollers 302 from the discharge casing 301 toward one of the discharge trays 312 to 315 selected by the position of the switching members 303.

Opening/Closing Cover of Image Reading Unit

The opening/closing cover 401 of the image reading unit 400 will be described with reference to the schematic drawings of FIGS. 2A, 2B, 3A and 3B.

Figure 2A:
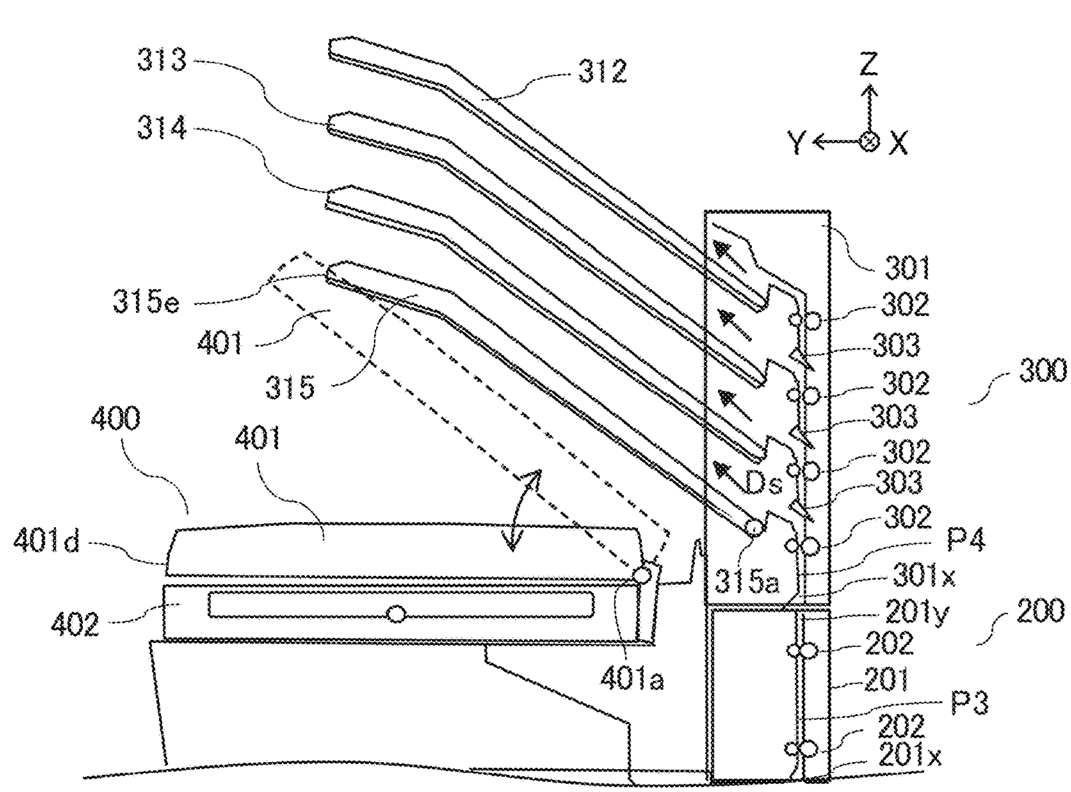
FIGS. 2A and 2B are each an explanatory view of the image forming apparatus according to the first embodiment.
Figure 2B:
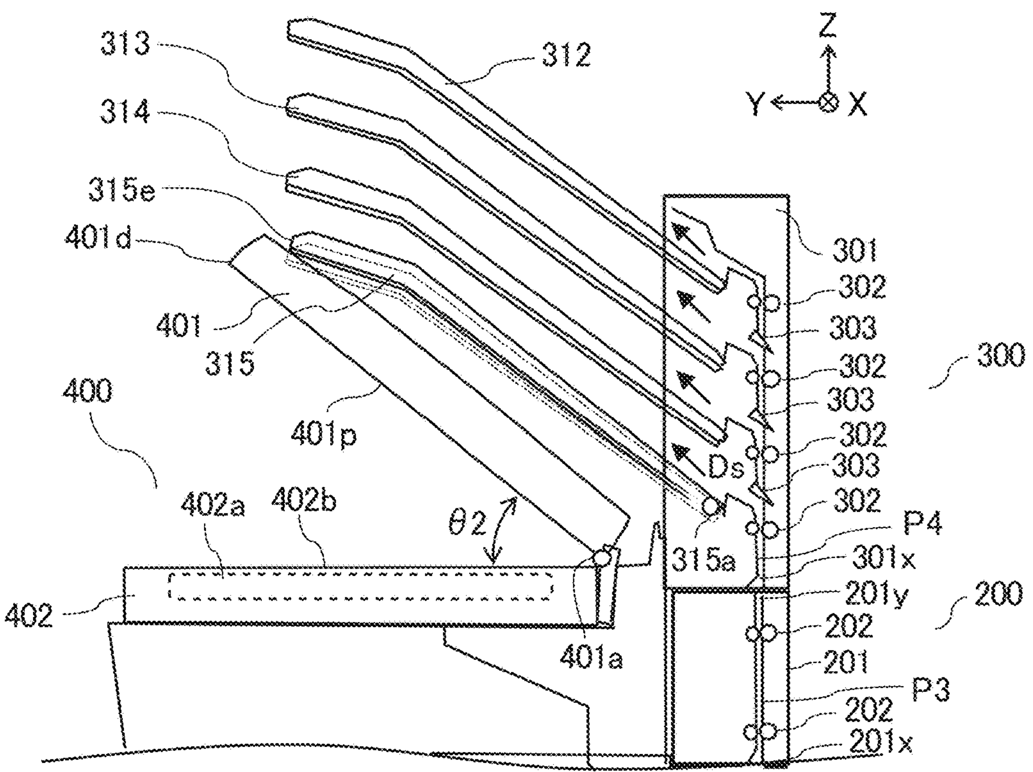

As illustrated in FIGS. 2A and 2B, the opening/closing cover 401 is movable between the closed position, i.e., solid line position of FIG. 2A, and the open position, i.e., broken line position of FIG. 2A and position of FIG. 2B. The open position is a position retracted upward from the closed position. More specifically, in a state where an end portion of the opening/closing cover 401 on a far side from the rotation shaft 401$a$ is referred to as a distal end 401$d$, a position of the distal end 401$d$ in a state where the opening/closing cover 401 is at an open position (FIG. 2A) is positioned above the position of the distal end 401$d$ in a state where the opening/closing cover 401 is at a closed position.

As illustrated in FIG. 2B, the reading main body 402 of the image reading unit 400 includes a platen glass 402$a$ which is a transparent member, and a reading unit 402$b$ for reading the image information from the document. The reading unit 402$b$ is, for example, a Contact Image Sensor (CIS) or a Charged-Coupled Device (CCD) image sensor, which is configured to acquire image information by optically scanning the document placed on the platen glass 402$a$. The image reading unit 400 may execute an image reading operation of reading an image information from a document using the reading unit 402$b$.

A pressure plate 401$p$ is disposed on a lower surface portion of the opening/closing cover 401. In a state where the opening/closing cover 401 is positioned at the closed position, the pressure plate 401$p$ opposes the platen glass 402$a$ and presses the document placed on the platen glass 402$a$. In a state where the opening/closing cover 401 is positioned at the open position, the pressure plate 401$p$ is separated, or retracted, to the upper direction from the platen glass 402$a$. The user places the document on the platen glass 402$a$ in a state where the opening/closing cover 401 is opened, and executes the image reading operation with the opening/closing cover 401 in the closed state.

The opening/closing cover 401, i.e., opening/closing member, may be an auto document feeder (ADF) equipped with a sheet feed tray and a feed roller for feeding documents automatically. The opening/closing cover 401, i.e., opening/closing member, may be a simple cover member that does not have the ADF function.

As illustrated in FIGS. 2A and 2B, the lowermost discharge tray 315 of the sheet discharge unit 300 is movable between a use position, i.e., first position, which is the position of FIG. 2A and broken line position of FIG. 2B, and a retracted position, i.e., second position, which is the position of FIG. 2B, retracted to the upper direction from the use position. The use position is a normal position in a case where the discharge tray 315 is used as a discharge destination of the sheet S.

As illustrated in FIG. 2B, when viewed in the X axis direction, the open position of the opening/closing cover 401 overlaps with the position of the lowermost discharge tray 315, i.e., dotted line position of FIG. 2B, in a state where the opening/closing cover 401 is at the closed position. In other words, when viewed in the rotational axis direction of the opening/closing cover 401, i.e., opening/closing member, an area to be occupied by the opening/closing cover 401 when the opening/closing cover 401 is at the open position, i.e., dotted line area of FIG. 2A, and an area to be occupied by the discharge tray 315, i.e., position of FIG. 2A, in a state where the discharge tray 315 is at the use position, i.e., first position, overlap. In other words, regarding a virtual plane orthogonal to the rotational axis of the opening/closing cover 401, a projection area of a vertical projection of the opening/closing cover 401 in the open position and a projection area of a vertical projection of the discharge tray 315 in the use position at least partially overlap.

The discharge tray 315 according to the present embodiment is rotatable with respect to the discharge casing 301 about a rotation shaft 315$a$. The direction of the rotation shaft 315$a$, i.e., rotational axis, of the discharge tray 315 is a direction intersecting both the discharge direction Ds toward which the sheet S is discharged toward the discharge tray 315 and the gravity direction, i.e., Z axis direction. The rotational axis of the discharge tray 315 is preferably parallel to the rotational axis of the opening/closing cover 401.

As described above, the discharge tray 315 is movable between the use position, i.e., broken line position of FIG. 2B, and the retracted position retracted upward from the use position. In further detail, an end on a far side from the rotation shaft 315$a$ of the discharge tray 315 is referred to as a distal end 315$e$. In this case, the position of the distal end 315$e$ when the discharge tray 315 is positioned at the retracted position (FIG. 2B) is higher than the position of the distal end 315$e$ when the discharge tray 315 is positioned at the use position (FIG. 2A). The discharge tray 315 is regulated from moving downward beyond the use position by its own weight by having a portion of the discharge tray 315 abut against a stopper provided on the discharge casing 301.

As described above, since the discharge tray 315 is configured movably, the discharge tray 315 retracts from the use position to the upper direction by being pressed by the opening/closing cover 401 when the opening/closing cover 401 is moved from the closed position to the open position. Therefore, the opening/closing cover 401 may be moved upward from the position where it comes into contact with the discharge tray 315 in the use position.

That is, the discharge tray 315 according to the present embodiment is configured to move from the use position to the retracted position when the opening/closing cover 401 moves from the closed position to the open position. The advantages of the present configuration will be described later.

Among the plurality of discharge trays 312 to 315 provided in the sheet discharge unit 300 of the present embodiment, the discharge trays 312 to 314 other than the lowermost discharge tray 315 do not move from the use position to the retracted position when the opening/closing cover 401 is moved from the closed position to the open position. The discharge trays 312 to 314 may adopt a simple configuration of being fixed to the discharge casing 301 in a non-rotatable manner. Alternatively, the plurality of discharge trays including the lowermost discharge tray 315 may be configured movably between the use position and the retracted position, such that they may move from the use position to the retracted position when the opening/closing cover 401 is moved from the closed position to the open position.

Figure 3A:
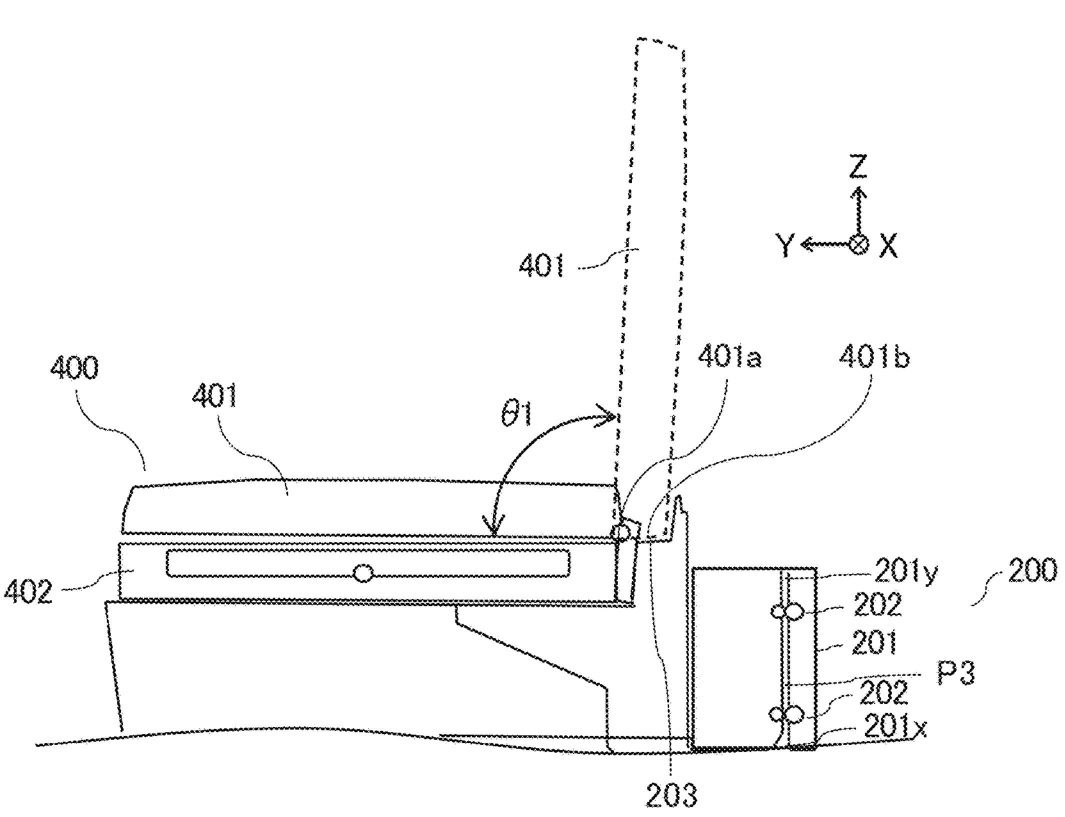
FIGS. 3A and 3B are each an explanatory view of the image forming apparatus according to the first embodiment.
Figure 3B:
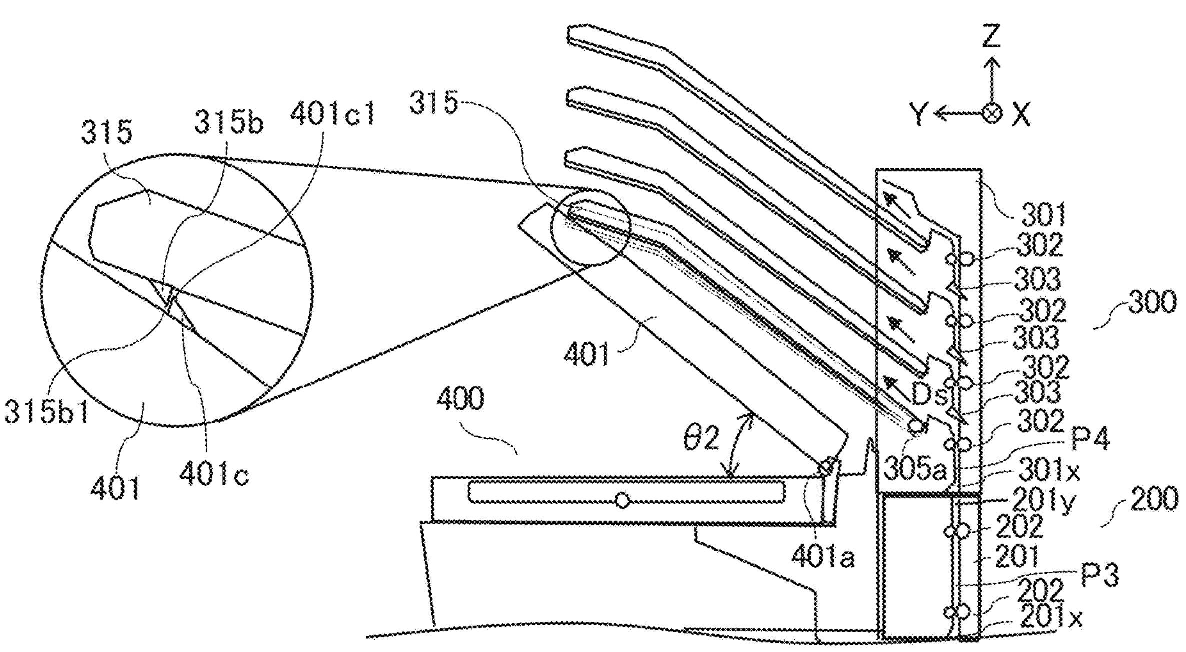

As illustrated in FIG. 3A, a maximum angle in which the opening/closing cover 401 may pivot from the closed position about the rotation shaft 401*a* in a state where the sheet discharge unit 300 is removed from the intermediate unit 200 is referred to as θ1. As illustrated in FIG. 3B, a maximum angle in which the opening/closing cover 401 may pivot from the closed position about the rotation shaft 401*a* in a state where the sheet discharge unit 300 is attached to the intermediate unit 200 is referred to as θ2. Angle θ2 is smaller than angle θ1, that is, θ2<θ1.

The position in which the opening/closing cover 401 is pivoted to angle θ2 from the closed position serving as reference is set as the open position of the opening/closing cover 401. The position in which the opening/closing cover 401 is pivoted to angle θ1 from the closed position serving as reference is set as the maximum open position of the opening/closing cover 401.

As illustrated in FIG. 3, in a state where the opening/closing cover 401 is at the maximum open position, i.e., angle θ1, a center of gravity of the opening/closing cover 401 is positioned at a rear side, which is the right side of the drawing or −Y side, of the rotation shaft 401*a*. Therefore, a moment in a clockwise direction in the drawing about the rotation shaft 401*a* acts on the opening/closing cover 401 by its own weight. By having a rear surface portion 401*b* of the opening/closing cover 401 abut against a receiving portion 203 provided on the intermediate unit 200, the opening/closing cover 401 is regulated from pivoting beyond angle θ1.

Meanwhile, as illustrated in FIG. 3B, in a state where the opening/closing cover 401 is at the open position, i.e., angle θ2, the center of gravity of the opening/closing cover 401 is positioned at a front side, which is the left side of the drawing or +Y side, of the rotation shaft 401*a*. Therefore, a moment in a counterclockwise direction, that is, in the direction toward the closed position, about the rotation shaft 401*a* acts on the opening/closing cover 401 by its own weight.

Now, as illustrated in an enlarged view on the left side of FIG. 3B, an engagement portion 315*b* is provided on the discharge tray 315, and an engaged portion 401*c* that may be engaged with the engagement portion 315*b* is provided on the opening/closing cover 401. The engagement portion 315*b* is an example of a holding portion configured to hold the opening/closing cover 401, i.e., opening/closing member, to the open position.

The engagement portion 315*b* and the engaged portion 401*c* are configured to be engaged while the opening/closing cover 401 is moved from the closed position to angle θ2. Further, by the engagement, that is, physical hooking, of the engagement portion 315*b* and the engaged portion 401*c*, the opening/closing cover 401 is held at the open position against the own weight of the opening/closing cover 401.

The specific aspects of the engagement portion 315*b* and the engaged portion 401*c* are not limited as long as the opening/closing cover 401 may be held in the position illustrated in FIG. 3B against its own weight, and one example thereof may be a pawl shape. In the state illustrated in FIG. 3B, pawls of the engagement portion 315*b* and the engaged portion 401*c* are formed such that a tip 315*b*1 of the pawl of the engagement portion 315*b* is positioned slightly inward with respect to a virtual circle about the rotation shaft 401*a* that passes a tip 401*cl* of the pawl of the engaged portion 401*c*. In that case, by hooking the pawls together, the opening/closing cover 401 is held at the open position against its own weight. When a user pushes down the opening/closing cover 401 with a force of a threshold value or greater, the hooking of the pawls is released by elastic deformation, and movement of the opening/closing cover 401 to the closed position is permitted. Further, when the opening/closing cover 401 is moved from the closed position to the open position, the tip 315*b*1 of the pawl of the engagement portion 315*b* moves beyond the position of the tip 401*cl* of the pawl of the engaged portion 401*c* by elastic deformation of one of the pawls, and the pawls are mutually hooked with each other.

The present technique is not limited to the above, and the engagement portion 315*b* and the engaged portion 401*c* may be composed of magnets or a combination of a magnet and a magnetic body such as a steel plate. In other words, the holding portion disposed on the discharge tray 315 may be designed to hold the opening/closing cover 401 at the open position by magnetic force.

Lock Mechanism of Image Reading Unit

Figure 4A:
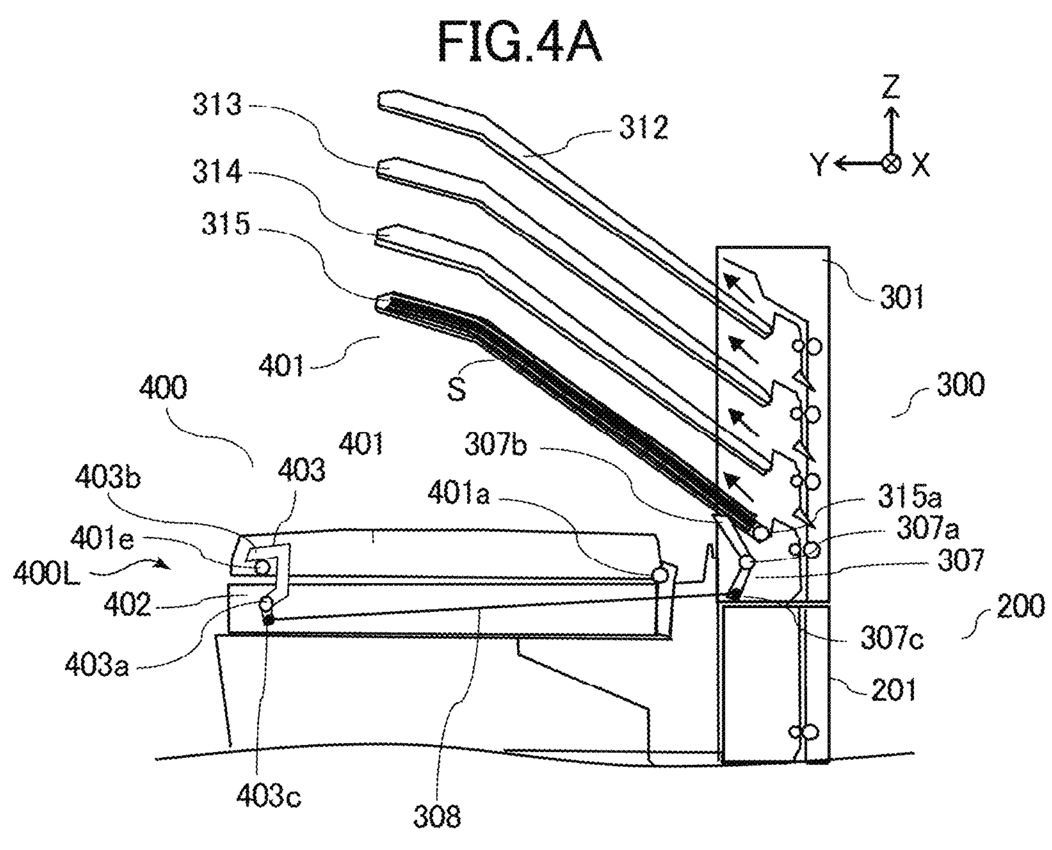
FIGS. 4A and 4B are each an explanatory view of a lock mechanism according to the first embodiment.
Figure 4B:
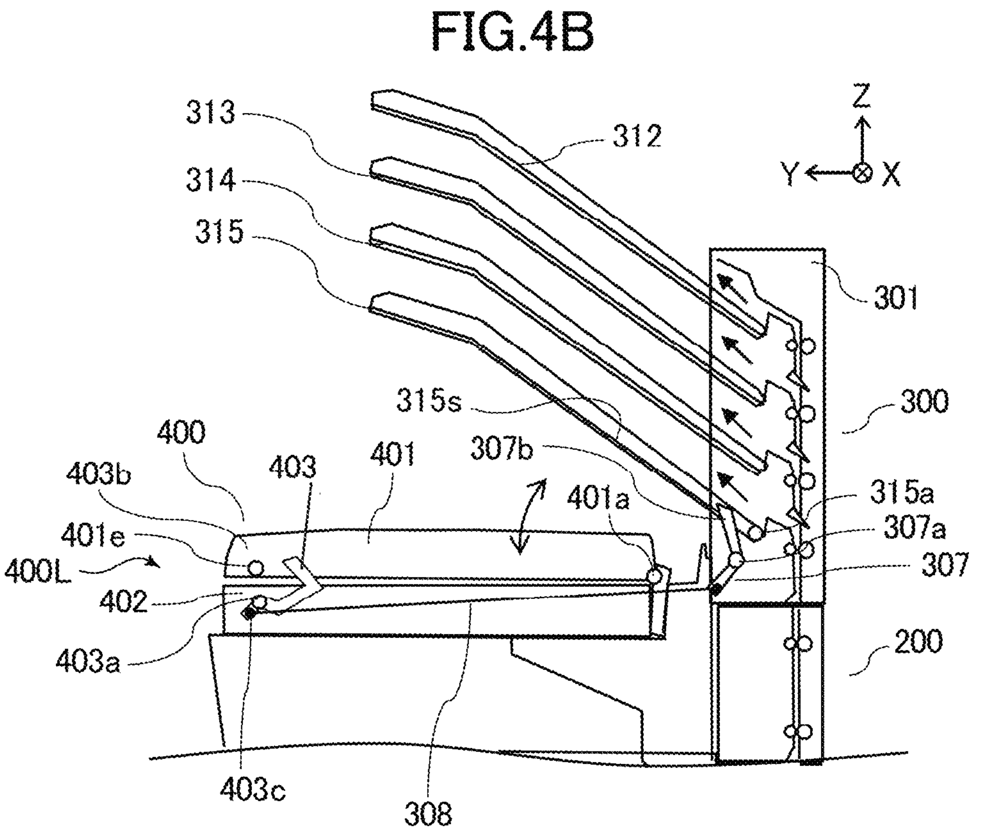

A lock mechanism 400L disposed on the image reading unit 400 will be described with reference to FIGS. 4A and 4B. FIG. 4A is a view illustrating a locked state of the lock mechanism 400L, and FIG. 4B is a view illustrating an unlocked state of the lock mechanism 400L.

As illustrated in FIG. 4A, a state in which the sheets S are supported on the lowermost discharge tray 315 of the sheet discharge unit 300 is considered. If the opening/closing cover 401 is moved from the closed position to the open position in this state, the discharge tray 315 may be moved upward from the use position, and the alignment of the sheets S on the discharge tray 315 may be disturbed.

Therefore, according to the present embodiment, the lock mechanism 400L configured to lock the opening/closing cover 401 to restrict the movement of the opening/closing cover 401 from the closed position toward the open position is provided. The lock mechanism 400L may take the locked state in which the movement of the opening/closing cover 401 from the closed position to the open position is regulated and the unlocked state in which the movement of the opening/closing cover 401 from the closed position to the open position is permitted. Further, the lock mechanism 400L is configured to take the locked state in a state where sheets S are supported on the discharge tray 315 and to take the unlocked state in a state where sheets S are not supported on the discharge tray 315.

The lock mechanism 400L according to the present embodiment includes a sheet presence flag 307, a lock member 403, and a link member 308.

The sheet presence flag 307 is supported pivotably about a pivot shaft 307*a* on the discharge casing 301. A detection end 307*b*, i.e., sheet contact portion, is disposed on one end, i.e., first end, of the sheet presence flag 307. The sheet presence flag 307 is a movable member that is movable between a protruded position, i.e., non-detection position, where the detection end 307*b* is protruded upward from a supporting surface 315*s* of the discharge tray 315 (FIG. 4B)

and a retracted position, i.e., detection position, where the detection end 307*b* is retracted downward from the protruded position.

The sheet discharge unit 300 includes a sensor, i.e., sheet presence sensor, configured such that the detection signal is changed according to the position of the sheet presence flag 307. The sheet presence sensor nay be a photo interrupter that is arranged such that an optical path is blocked by a portion of the sheet presence flag 307. In addition, each of the other discharge trays 312 to 314 of the sheet discharge unit 300 may be provided with a sheet presence flag similar to the sheet presence flag 307 and a sheet presence sensor corresponding thereto. A control unit provided on the image forming apparatus 1 may perform control according to presence/absence of a sheet S for each of the discharge trays 312 to 315 based on the detection signals of the respective sheet presence sensors.

The lock member 403 is supported pivotably about a pivot shaft 403*a* on the casing of the reading main body 402. That is, the lock member 403 is a lever member or arm member that pivots about the pivot shaft 403*a*. A hook portion 403*b*, i.e., locking portion or lock pawl, designed to be engaged with a projected portion 401, i.e., locked portion, of the opening/closing cover 401 is provided on one end, i.e., first end, of the lock member 403. The lock member 403 is movable to a lock position, i.e., engagement position, where the hook portion 403*b* is engaged with the projected portion 401, and to a lock releasing position, i.e., disengagement position, where the hook portion 403*b* is disengaged from the projected portion 401*e*. When the lock member 403 is at the lock position, the hook portion 403*b* prevents the upward movement of the projected portion 401, such that the movement from the closed position to the open position of the opening/closing cover 401 is regulated.

The locked state of the lock mechanism 400L is a state in which the lock member 403 is at the lock position, and the unlocked state of the lock mechanism 400L is a state in which the lock member 403 is at the lock releasing position.

The link member 308, i.e., connecting member, connects the other end, i.e., second end 307*c*, of the sheet presence flag 307 and the other end, i.e., second end 403*c*, of the lock member 403. Pivoting of the sheet presence flag 307 about the pivot shaft 307*a* and the pivoting of the lock member 403 about the pivot shaft 403*a* are interlocked by the link member 308. The link member 308 may be a rod-shaped member or a metal wire, as long as it may mechanically connects and interlocks the sheet presence flag 307 and the lock member 403.

As illustrated in FIG. 4A, in a state where the sheet S is supported on the discharge tray 315, the detection end 307*b* of the sheet presence flag 307 is pushed down by the sheets S, and the sheet presence flag 307 is positioned at the retracted position. The pivoting of the sheet presence flag 307 is transmitted via the link member 308 to the lock member 403, and in an interlocked manner with the movement of the sheet presence flag 307 from the protruded position to the retracted position, the lock member 403 moves from the lock releasing position to the lock position. That is, the lock member 403 is configured to be positioned at the lock position when the sheets S are supported on the discharge tray 315. Thereby, the lock mechanism 400L will be in the locked state, and the opening of the opening/closing cover 401 is regulated.

As illustrated in FIG. 4B, when the sheets S are removed from the discharge tray 315, the sheet presence flag 307 pivots from the retracted position to the protruded position. The pivoting of the sheet presence flag 307 is transmitted via the link member 308 to the lock member 403, and the lock member 403 is moved from the lock position to the lock releasing position in an interlocked manner with the movement of the sheet presence flag 307 from the retracted position to the protruded position. That is, the lock member 403 is configured to be positioned at the lock releasing position in a state where the sheets S are not supported on the discharge tray 315. Thereby, the lock mechanism 400L will be in the unlocked state, and the user is permitted to perform an operation to release the opening/closing cover 401.

Summary of First Embodiment

As described above, according to the first embodiment, the lowermost discharge tray 315 of the sheet discharge unit 300 is configured to be moved from the use position to the retracted position when the opening/closing cover 401 of the image reading unit 400 is moved from the closed position to the open position. Therefore, the discharge tray 315 may be arranged at a lower position, and the sheet discharge unit 300 may be downsized in the up-down direction and the entirety of the image forming apparatus 1 may be downsized in the up-down direction. That is, an image forming apparatus that may be downsized in the up-down direction may be provided.

Figure 7:
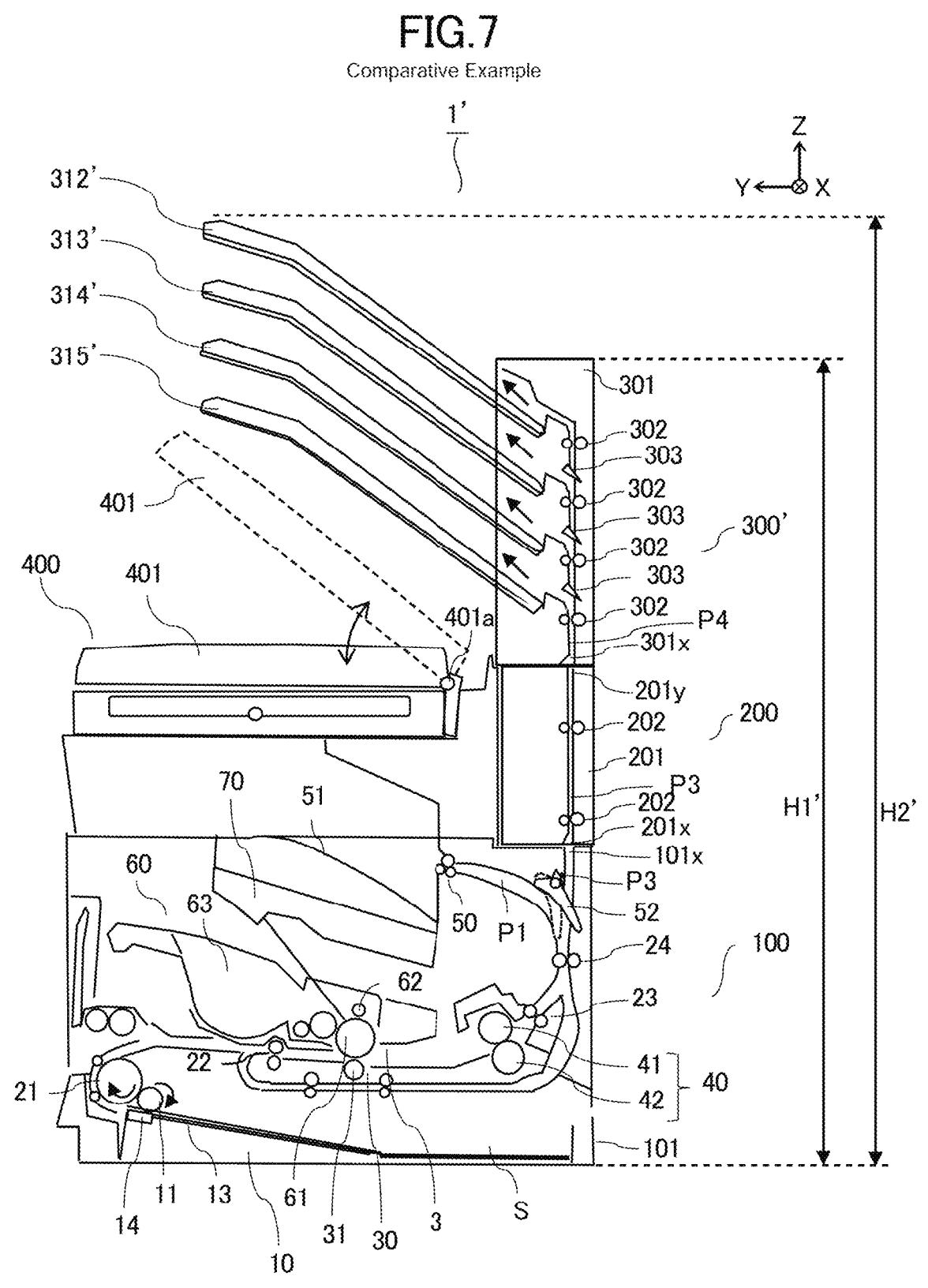

The reason why the configuration of the first embodiment allows further downsizing of the apparatus will be described with reference to FIG. 7. FIG. 7 is a schematic drawing of an image forming apparatus 1' according to a comparative example with respect to the first embodiment. In a sheet discharge unit 300' of the image forming apparatus 1' according to the comparative example, a lowermost discharge tray 315' is fixed non-rotatably to the discharge casing 301, unlike the first embodiment in which the lowermost discharge tray 315' is disposed rotatably on the discharge casing 301.

According to the sheet discharge unit 300' of the comparative example, a discharge tray 315' is arranged above the discharge tray 315 of the first embodiment such that the opening/closing cover 401 and the lowermost discharge tray 315' do not interfere with each other. That is, the discharge tray 315' of the comparative example is arranged at a position shifted upward from a position of the discharge tray 315 according to the first embodiment (FIG. 2A) in the use position, so that the discharge tray 315' does not interfere with the opening/closing cover 401 even when the opening/closing cover 401 is moved to the open position, i.e., dashed line of FIG. 2A. Further, along with the upward shift of the discharge tray 315', the discharge trays 312 to 314 disposed further upward or the conveyance rollers 302 and the switching members 303 are also arranged at positions shifted upward for the same distance from the positions of corresponding members in the first embodiment. The other configurations are the same in the sheet discharge unit 300' of the comparative example and the sheet discharge unit 300 of the first embodiment.

According to the comparative example, as described above, the lowermost discharge tray 315' is positioned higher than the discharge tray 315 of the first embodiment so as to avoid interference with the opening/closing cover 401. Along therewith, according to the comparative example, the conveyance rollers 302 and the switching members 303 within the discharge casing 301 are also positioned higher than the positions of corresponding members according to the first embodiment. Therefore, a main body height H1' of the image forming apparatus 1' according to the comparative example is higher than the first embodiment. That is, according to the configuration of the first embodiment, a main body height H1 of the image forming apparatus 1 (FIG. 1) may be set lower than the main body height H1' of the comparative example, i.e., H1<H1'. The main body height H1 or H1' of the image forming apparatus 1 or 1' is a distance from a floor surface on which the image forming apparatus 1 or 1' is disposed to an upper surface of the discharge casing 301 of the sheet discharge unit 300 in the up-down direction, i.e., Z axis direction.

According to the comparative example, as described above, the lowermost discharge tray 315' is arranged at an upper position than the discharge tray 315 of the first embodiment so as to avoid the opening/closing cover 401. Along therewith, according to the comparative example, the discharge trays 312' to 314' that are arranged further upward are also arranged at upper positions than the positions of the discharge trays 312 to 314 according to the first embodiment. Therefore, a product height H2' of the image forming apparatus 1' according to the comparative example becomes higher than the first embodiment. That is, according to the configuration of the first embodiment, a product height H2 of the image forming apparatus 1 (FIG. 1) may be set lower than the product height H2' of the comparative example, i.e., H2<H2'. The product height H2 or H2' of the image forming apparatus 1 or 1' is a distance from the floor surface on which the image forming apparatus 1 or 1' is disposed to an upper end position of the uppermost discharge tray 312 in the up-down direction, i.e., Z axis direction.

As described, the present embodiment enables to provide the image forming apparatus 1 that may be downsized. The present embodiment further enables to provide the sheet discharge unit 300 serving as an option unit that may realize downsizing of the image forming apparatus 1 when being used in combination with the image reading unit 400 equipped with the opening/closing cover 401.

According further to the present embodiment, a configuration that holds the opening/closing cover 401 at the open position by the engagement of the opening/closing cover 401 and the discharge tray 315 is adopted, such that there is no need to provide a holding mechanism for holding the opening/closing cover 401 at the open position in the image reading unit 400. The holding mechanism mentioned above is a mechanism that is disposed at a connection portion, i.e., hinge portion, between the opening/closing cover 401 and the reading main body 402, that regulates the movement of the opening/closing cover 401 by its own weight from the open position to the closed position while allowing the opening/closing cover 401 to move between the closed position and the open position. The opening/closing cover 401 may be held at the open position by a simple configuration without providing a holding mechanism on the image reading unit 400, such that the manufacturing costs of the image reading unit 400 may be suppressed.

Further according to the present embodiment, the lock mechanism 400L of the opening/closing cover 401 is provided, such that the movement of the opening/closing cover 401 from the closed position to the open position may be limited in a state where the sheets S are supported on the discharge tray 315. Thereby, the disturbance of the aligned state of the sheets S on the discharge tray 315 may be suppressed.

Modified Example

In the present embodiment, it has been described that the main body height H1 and the product height H2 of the image forming apparatus 1 may be downsized compared to the comparative example (FIG. 7) equipped with the same number of discharge trays 312' to 315' as the present embodiment, but the number of discharge trays according to the sheet discharge unit 300 may be varied. For example, it may be possible to dispose five or more discharge trays on the sheet discharge unit 300. Even according to this case, the lowermost discharge tray 315 may be arranged at a lower position according to the configuration of the present embodiment, such that the main body height H1 and the product height H2 may be suppressed from being increased.

The present embodiment has illustrated a configuration in which the opening/closing cover 401 is held at the open position by engagement of the engagement portion 315*b* disposed on the front side of the discharge tray 315 in the discharge direction Ds and the engaged portion 401*c* disposed on the front side of the opening/closing cover 401 in the discharge direction Ds. Nevertheless, a configuration may be adopted in which the opening/closing cover 401 is held at the open position by having the engagement portion disposed on the discharge casing 301 that is arranged rearward than the discharge tray 315 in the discharge direction Ds engage with the engaged portion disposed on the rear side portion of the opening/closing cover 401.

In the present embodiment, the engagement portion 315*b*, i.e., holding portion, that may hold the opening/closing cover 401 at the open position is provided on the discharge tray 315 disposed pivotably with respect to the discharge casing 301. However, the engagement portion 315*b*, i.e., holding portion, may be provided on the discharge tray 315 that is disposed non-pivotably with respect to the discharge casing 301. Even according to that case, the opening/closing cover 401 may be held at the open position by a simple configuration, and the manufacturing costs of the image reading unit 400 may be suppressed.

The present embodiment illustrated a configuration of the lock mechanism 400L that limits the opening of the opening/closing cover 401 in which the lock member 403 is mechanically connected with the sheet presence flag 307 disposed on the discharge tray 315 to be interlocked with the sheet presence flag 307. The present technique is not limited to this example, and it may be possible to adopt a sensor, i.e., sheet presence sensor, that outputs detection signals that change in accordance with the position of the sheet presence flag 307, and an actuator such as a solenoid that is controlled based on the detection signal of the sheet presence sensor. In other words, it may be possible to adopt a lock mechanism that is switched between the locked state and the unlocked state by having a control unit provided on the image forming apparatus 1 send a drive command to an actuator based on the detection signal of the sheet presence sensor and move the lock member 403.

It is also possible to adopt a sensor that outputs detection signals that change in accordance with the amount of sheets S supported on the discharge tray 315, instead of the sheet presence sensor described above. For example, a weight sensor configured to output detection signals that change in accordance with the weight of the sheets S on the discharge tray 315, or a sensor, i.e., sheet upper surface sensor, configured to output detection signals that change in accordance with a rotation angle of the flag disposed above the discharge tray 315 may be adopted. In other words, a lock mechanism may be adopted that is switched between the locked state and the unlocked state by having the control unit disposed on the image forming apparatus 1 send a drive command to an actuator based on a detection signal of a weight sensor or a sheet upper surface sensor to move the lock member 403.

Second Embodiment

Next, an image forming apparatus 1 according to another embodiment (second embodiment) will be described with reference to FIGS. 5A and 5B. The second embodiment differs from the first embodiment in that an interlocking mechanism 500 that mechanically connects the opening/closing cover 401 and the discharge tray 315 is provided. Other than the configurations related to the interlocking mechanism 500, the configurations and functions of the image forming apparatus body 100, the intermediate unit 200, the sheet discharge unit 300, and the image reading unit 400 are the same as the first embodiment. Hereafter, elements denoted with the same reference numbers as the first embodiment basically have the same configurations and function as those illustrated in the first embodiment, unless denoted otherwise, and the portions that differ from the first embodiment will mainly be described.

Figure 5A:
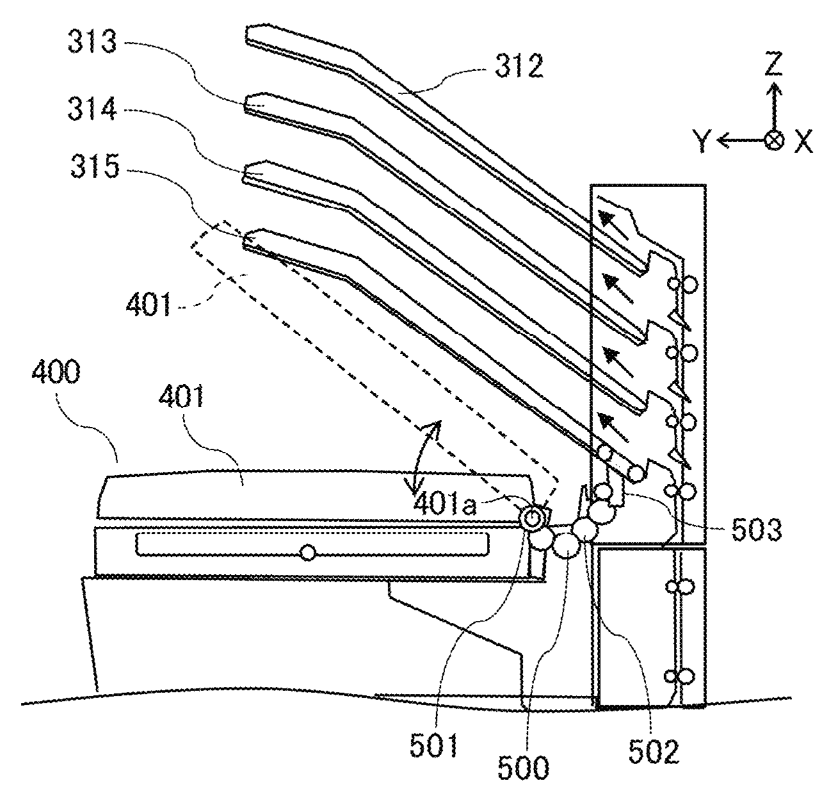
FIGS. 5A and 5B are each an explanatory view of an image forming apparatus according to a second embodiment.

FIG. 5A is a schematic drawing illustrating a portion of the image forming apparatus 1 according to the second embodiment. FIG. 5B is a perspective view illustrating a part of the discharge tray 315 and the interlocking mechanism 500 according to the second embodiment, and a detailed side view in which a portion of the interlocking mechanism 500, which is the circled area in the perspective view, is viewed in the X axis direction.

As illustrated in FIG. 5A, the image forming apparatus 1 according to the second embodiment is provided with the interlocking mechanism 500. The interlocking mechanism 500 includes an opening/closing gear 501, a gear train 502, pinion gears 503, a drive transmission shaft 504, and rack portions 315*d*.

The opening/closing gear 501 is provided on the image reading unit 400. The gear train 502 is provided on the intermediate unit 200. The pinion gear 503, the drive transmission shaft 504, and the rack portions 315*d* are provided on the sheet discharge unit 300. In the present embodiment, the elements (501, 502, 503, and 504) that constitute the interlocking mechanism 500 are arranged in a dispersed manner on the intermediate unit 200, the sheet discharge unit 300, and the image reading unit 400.

The opening/closing gear 501 is provided on one end of the rotation shaft 401*a* of the opening/closing cover 401, and rotates integrally with the rotation shaft 401*a* along with the opening and closing of the opening/closing cover 401. A gear on one end of the gear train 502 is meshed with the opening/closing gear 501, and a gear on the other end of the gear train 502 is meshed with one of the two pinion gears 503. The rotation of the opening/closing gear 501 is transmitted via the gear train 502 to the pinion gear 503, by which the pinion gear 503 rotates in an interlocked manner with the opening/closing gear 501.

Figure 5B:
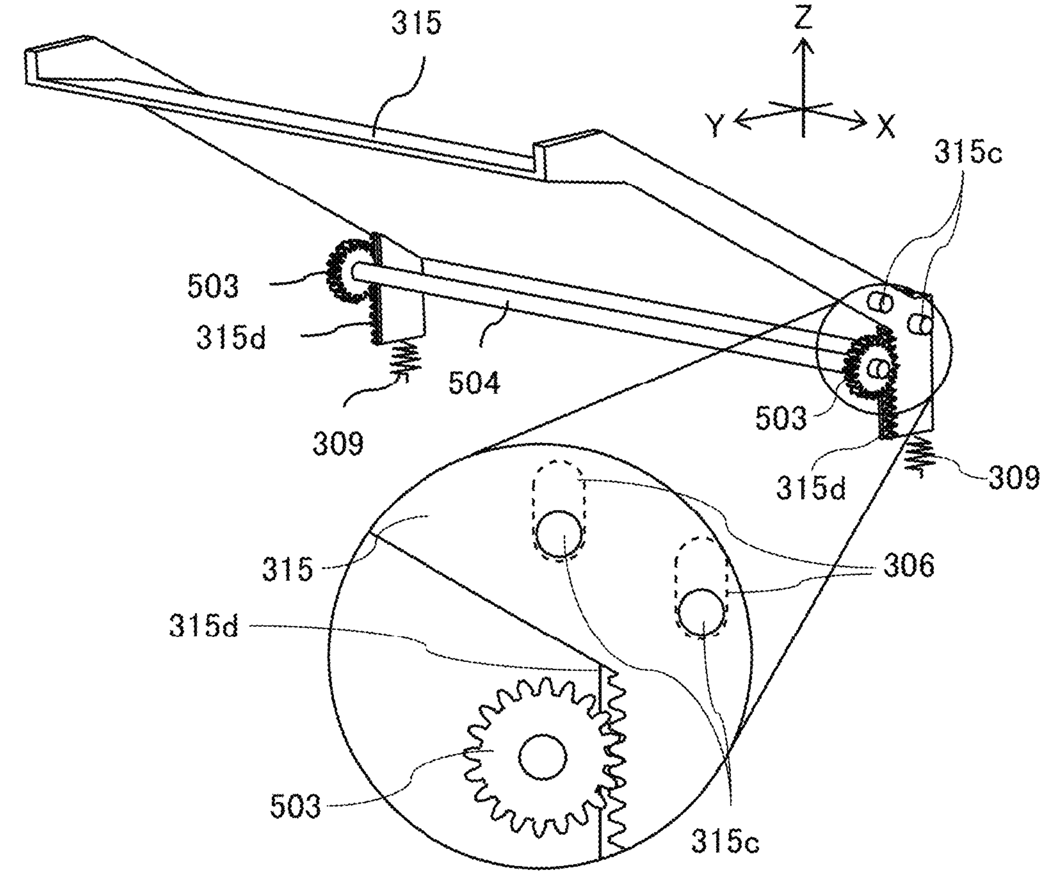

As illustrated in FIG. 5B, a plurality of projected portions 315*c*, i.e., guided portions, are disposed on both side surfaces of the discharge tray 315 in the X axis direction. The respective projected portions 315*c* are engaged slidably with long holes 306, i.e., guide portions, disposed on the discharge casing 301. The long holes 306 extend along the up-down direction. By engagement of the projected portions 315*c* and the long holes 306, the lowermost discharge tray 315 of the sheet discharge unit 300 is supported so as to move linearly in a direction along the Z axis direction, i.e., gravity direction, with respect to the discharge casing 301.

The discharge tray 315 according to the present embodiment moves in reciprocating movement along the Z axis direction between a use position, i.e., lower position, in which the projected portions 315*c* are positioned at the lower end portion of the long holes 306 and a retracted position, i.e., upper position, retracted to the upper direction from the use position.

Further, rack portions 315*d* are formed at lower portions on both sides of the discharge tray 315 in the X axis direction. That is, the rack portions 315*d* are formed integrally with the discharge tray 315. Further, the discharge tray 315 is urged downward, that is, toward the use position, by urging members 309 that abut against end faces on the lower side of the respective rack portions 315*d*.

The pinion gears 503 are each arranged on either side in the X axis direction to correspond to the two rack portions 315*d*. That is, one of the pinion gears 503 is meshed with one of the rack portions 315*d*, and the other pinion gear 503 is meshed with the other one of the rack portions 315*d*. The two pinion gears 503 are respectively disposed on ends of the drive transmission shaft 504 that extends in the X axis direction, and rotates integrally with the drive transmission shaft 504. Further, either one of the two pinion gears 503 is meshed with the gear of the gear train 502. The pinion gears 503 are configured to rotate in an interlocked manner with the movement of the opening/closing cover 401, i.e., opening/closing member, via the opening/closing gear 501 and the gear train 502.

Operation during Opening and Closing of Opening/Closing Cover

Figure 6A:
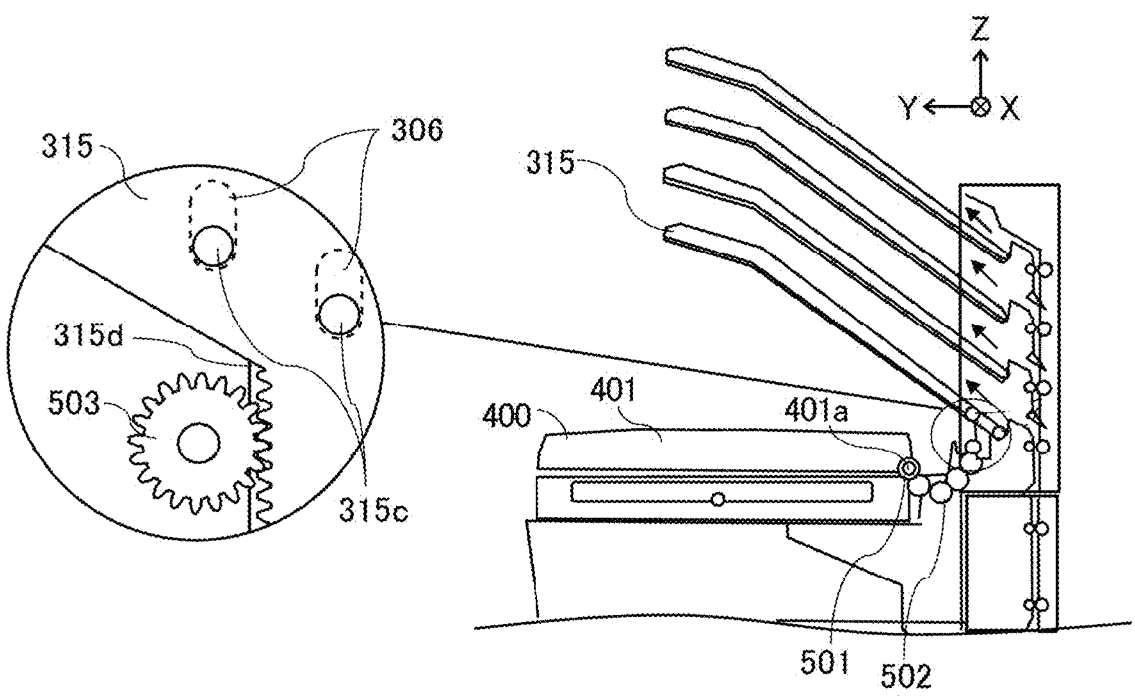
FIGS. 6A and 6B are each an explanatory view of the image forming apparatus according to the second embodiment.
Figure 6B:
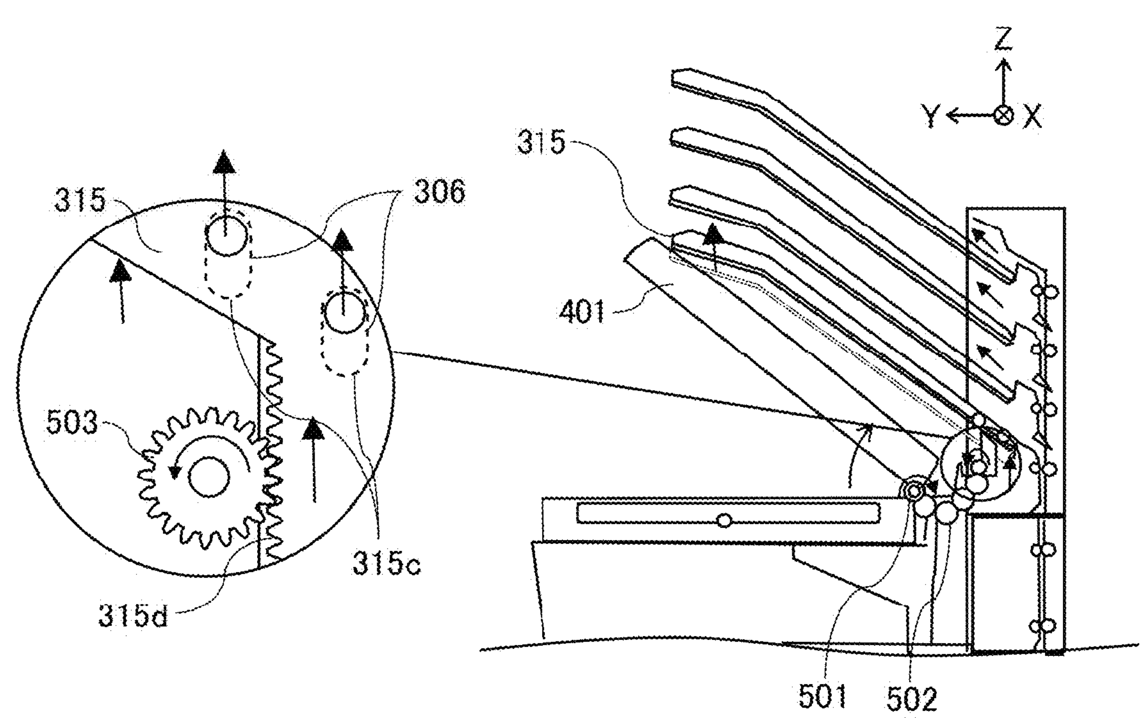

An operation of the interlocking mechanism 500 and the discharge tray 315 in a state where the opening/closing cover 401 of the image reading unit 400 is opened and closed will be described with reference to FIGS. 6A and 6B. FIG. 6A is a schematic drawing illustrating a portion of the image forming apparatus 1 in a state where the opening/closing cover 401 is positioned at the closed position, and a detailed side view of a portion of the interlocking mechanism 500. FIG. 6B is a schematic drawing illustrating a portion of the image forming apparatus 1 in a state where the opening/closing cover 401 is positioned at the open position, and a detailed side view of a portion of the interlocking mechanism 500.

As described above, when reading the image information from a document using the image reading unit 400, the user moves the opening/closing cover 401 from the closed position (FIG. 6A) to the open position (FIG. 6B) and places the document on the platen glass 402*a*.

As illustrated in FIG. 6A, in a state where the opening/closing cover 401 is at the closed position, the discharge tray 315 is supported on the discharge casing 301 in a state where the projected portions 315*c* are abutted against a lower end portion of the long holes 306.

As illustrated in FIG. 6B, when the opening/closing cover 401 is moved from the closed position to the open position, the rotation of the opening/closing cover 401 is transmitted via the opening/closing gear 501 and the gear train 502 to the pinion gear 503, and the pinion gear 503 is rotated in a counterclockwise direction in the drawing. By having the pinion gear 503 rotate in the counterclockwise direction in the drawing, the rack portions 315*d* are moved upward, and the discharge tray 315 is moved from the use position to the retracted position. In this state, the discharge tray 315 moves parallelly to the upper direction while maintaining the angle of the supporting surface 315*s* with respect to the horizontal surface.

When the opening/closing cover 401 is moved from the open position to the closed position, the rotation of the opening/closing cover 401 is transmitted via the opening/closing gear 501 and the gear train 502 to the pinion gear 503, and the pinion gear 503 is rotated in a clockwise direction in the drawing. In a state where the pinion gear 503 is rotated, the rack portions 315*d* is moved downward, and the discharge tray 315 is moved from the retracted position to the use position. Even in this state, the discharge tray 315 moves parallelly to the upper direction while maintaining the angle of the supporting surface 315*s* with respect to the horizontal surface.

According similarly to the present embodiment, the open position of the opening/closing cover 401 is superposed with the position of the lowermost discharge tray 315, i.e., position of FIG. 6A, and broken line position of FIG. 6B, in a state where the opening/closing cover 401 is at the closed position when viewed in the X axis direction. In other words, when viewed in the rotational axis direction of the opening/closing cover 401, i.e., opening/closing member, an area to be occupied by the opening/closing cover 401 in a case the opening/closing cover 401 is at the open position (FIG. 6B) and an area to be occupied by the discharge tray 315 in a case where the discharge tray 315 is at the use position, i.e., first position, overlap. As described above, by having the discharge tray 315 move up and down in an interlocked manner with the opening and closing of the opening/closing cover 401, the opening/closing cover 401 may be opened and closed without interfering with the discharge tray 315.

Summary of Second Embodiment

As described above, similarly according to the present embodiment, the discharge tray 315 is moved from the use position, i.e., first position, to the retracted position, i.e., second position, when the opening/closing cover 401, i.e., opening/closing member, is moved from the closed position to the open position. Therefore, due to reasons similar to the first embodiment, the main body height H1 and the product height H2 of the image forming apparatus 1 may be reduced. In other words, the present embodiment enables to provide an image forming apparatus that may be downsized in the up-down direction.

According further to the present embodiment, the discharge tray 315 is moved linearly with respect to the discharge casing 301, such that the disturbance of the aligned state of the sheets S on the discharge tray 315 may be suppressed.

Modified Example

The present embodiment illustrated a configuration in which the discharge tray 315 is moved linearly with respect to the discharge casing 301, but it may also adopt a configuration in which the discharge tray 315 is pivoted, i.e., moved in rotation, with respect to the discharge casing 301, similar to the first embodiment. In that case, the interlocking mechanism 500 may adopt a configuration where the pinion gear 503 is meshed with the rotation shaft 401*a* (FIG. 2B) of the discharge tray 315, such that the discharge tray 315 is interlocked with the opening and closing of the opening/closing cover 401.

According to the present embodiment, the interlocking mechanism 500 composed of a gear train has been illustrated, but a configuration for mechanically connecting the opening/closing cover 401 and the discharge tray 315 to operate in an interlocked manner with each other is not limited thereto. For example, it may be possible to adopt an interlocking mechanism in which a rotary member that rotates in an interlocked manner with the opening/closing cover 401 and a rotary member that rotates in an interlocked manner with the discharge tray 315 are connected by a belt or a chain. Further, a link mechanism configured to interlock the opening/closing cover 401 and the discharge tray 315 may be adopted as the interlocking mechanism.

According further to the present embodiment, a configuration where only the lowermost discharge tray 315 of the sheet discharge unit 300 is moved in an interlocked manner with the opening and closing operation of the opening/closing cover 401 has been illustrated. However, the present technique may be configured such that a plurality of discharge trays including the lowermost discharge tray 315 are moved in an interlocked manner with the opening and closing operation of the opening/closing cover 401.

OTHER EMBODIMENTS

Figure 8:
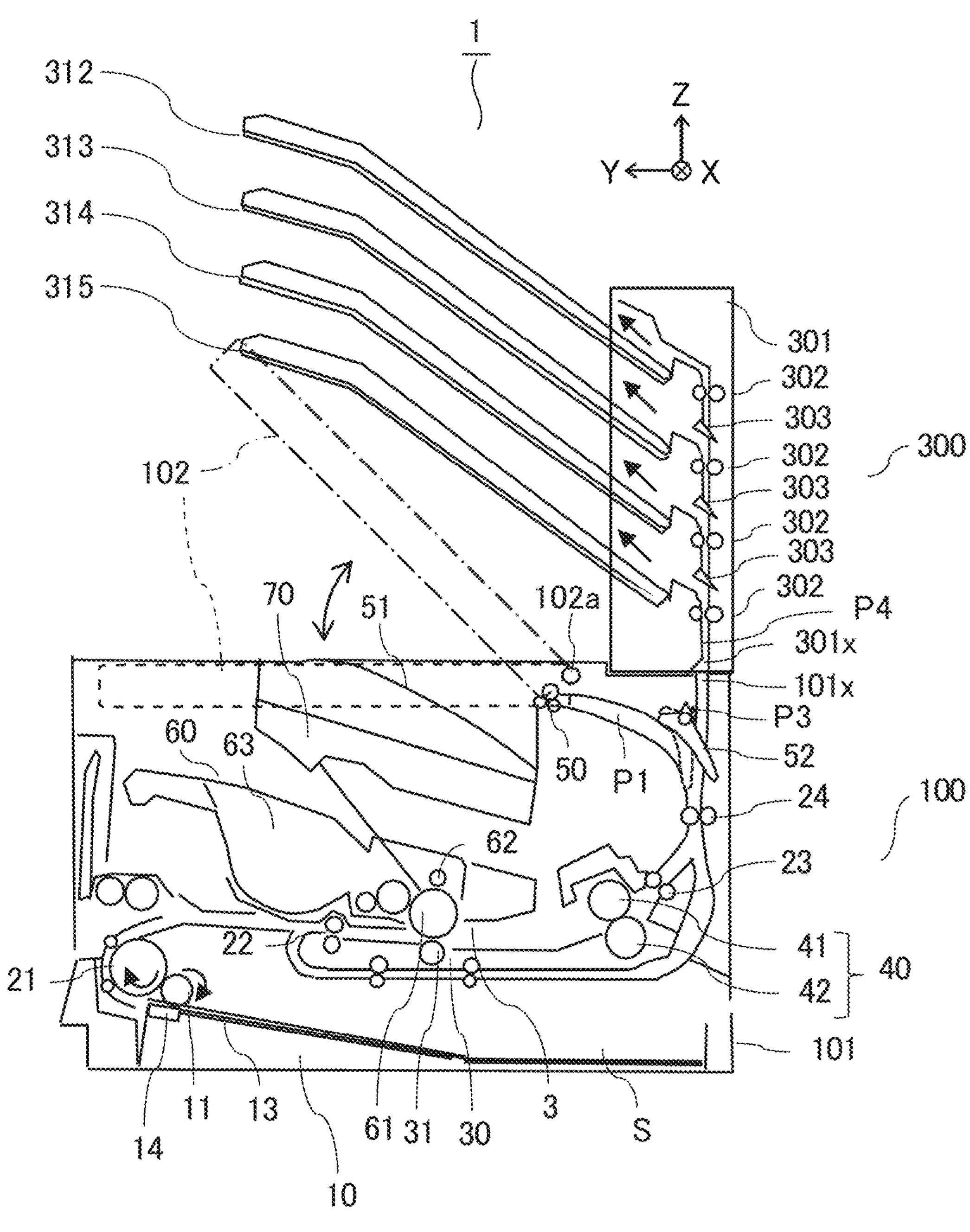
FIG. 8 is a schematic drawing of an image forming apparatus according to a modified example.

In the embodiments described above, the opening/closing cover 401 disposed on an upper surface portion of the image reading unit 400 has been illustrated as an example of the opening/closing member. The present technique is not limited thereto, and the opening/closing member may be an opening/closing unit 102 disposed on the upper surface portion of the image forming apparatus body 100, as illustrated in FIG. 8. In the modified example illustrated in FIG. 8, the image reading unit 400 and the intermediate unit 200 are not attached to the image forming apparatus body 100, and only the sheet discharge unit 300 is attached to the upper portion of the image forming apparatus body 100. The opening/closing unit 102 is capable of pivoting about a rotation shaft 102*a*, and it is movable between a closed position, which is illustrated by the broken line, that forms at least a portion of the upper surface of the image forming apparatus body 100, and an open position, which is illustrated by the dashed-dotted line, above the closed position. By opening the opening/closing unit 102, it may be possible to access the inner side of the image forming apparatus body 100 from above and perform maintenance operations thereof.

Even according to the present modified example, when the opening/closing unit 102 is moved from the closed position to the open position, the lowermost discharge tray 315 of the sheet discharge unit 300 is moved from the use position, i.e., the position illustrated in FIG. 8, to the retracted position above the use position. The configurations illustrated in the first or second embodiment may be adopted as the configuration for enabling movement of the discharge tray 315. Thereby, advantages similar to the first and second embodiments may be achieved.

According to the embodiments described above, the image forming portion 3 adopting an electrophotographic system has been illustrated as an image forming unit for forming images on sheets S, but the present technique is not limited thereto. For example, an inkjet-type image forming unit that discharges ink through nozzles may be used as the image forming unit.

The embodiments described above has been illustrated based on a monochromatic image forming apparatus that forms a single-color image on the sheet S, but the present technique may also be applied to a full-color mage forming apparatus in which toners of multiple colors are used to form color images on the sheets S.

The embodiments described above have been illustrated based on an image forming apparatus for forming images on sheets, but the present technique may also be applied to an auto document feeder (ADF) for feeding documents automatically or to a post-processing apparatus that performs post-processing to sheets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-214288, filed Dec. 19, 2023, which is hereby incorporated by reference herein in its entirety.

What is claimed is:

1. An image forming apparatus comprising:

an apparatus body accommodating an image forming unit configured to form an image on a sheet;

an image reading unit disposed above the apparatus body and configured to read an image information, the image reading unit including an opening/closing member movable to a closed position and to an open position above the closed position; and a sheet discharge unit disposed above the apparatus body and configured to discharge a sheet on which an image has been formed by the image forming unit, the sheet discharge unit including a discharge tray configured to support a discharged sheet, the discharge tray being disposed above the opening/closing member, movable to a first position and to a second position above the first position, and configured to move from the first position to the second position when the opening/closing member is moved from the closed position to the open position, wherein the sheet discharge unit includes a plurality of discharge trays including the discharge tray, wherein the discharge tray is a lowermost discharge tray among the plurality of discharge trays, and wherein among the plurality of discharge trays, a discharge tray other than the lowermost discharge tray is configured not to move when the opening/closing member is moved from the closed position to the open position.

2. The image forming apparatus according to claim 1, wherein the opening/closing member is configured to pivot about a rotational axis, and wherein, when viewed in a direction of the rotational axis, an area to be occupied by the opening/closing member in a case where the opening/closing member is at the open position and an area to be occupied by the discharge tray in a case where the discharge tray is at the first position overlap.

3. The image forming apparatus according to claim 1, wherein the discharge tray is configured to be pushed by the opening/closing member and moved from the first position to the second position when the opening/closing member is moved from the closed position to the open position.

4. The image forming apparatus according to claim 1, further comprising:

an interlocking mechanism configured to connect the opening/closing member and the discharge tray to operate in an interlocked manner with each other, the interlocking mechanism being configured to transmit force from the opening/closing member to the discharge tray so that the discharge tray moves from the first position to the second position when the opening/closing member is moved from the closed position to the open position.

5. The image forming apparatus according to claim 4, wherein the interlocking mechanism includes a rack portion formed integrally with the discharge tray and a pinion gear that is engaged with the rack portion and that is configured to rotate in an interlocked manner with a movement of the opening/closing member.

6. The image forming apparatus according to claim 1, wherein the sheet discharge unit includes a casing that supports the discharge tray, and wherein the discharge tray is configured to pivot with respect to the casing.

7. The image forming apparatus according to claim 1, wherein the sheet discharge unit includes a casing that supports the discharge tray, and wherein the discharge tray is configured to move linearly in a direction along a gravity direction with respect to the casing.

8. The image forming apparatus according to claim 1, wherein the discharge tray includes a holding portion that is configured to hold the opening/closing member at the open position.

9. The image forming apparatus according to claim 8, wherein the opening/closing member includes an engaged portion, and wherein the holding portion is configured to engage the engaged portion while the opening/closing member is moved from the closed position to the open position.

10. The image forming apparatus according to claim 1, further comprising:

a lock mechanism configured to lock the opening/closing member to restrict a movement of the opening/closing member from the closed position toward the open position.

11. The image forming apparatus according to claim 10, wherein the lock mechanism includes a lock member being movable to a lock position where the lock member is engaged with a locked portion disposed on the opening/closing member and to a lock releasing position where the lock member is disengaged from the locked portion, and wherein the lock member is configured to be positioned at the lock releasing position in a state where no sheets are supported on the discharge tray, and to be positioned at the lock position in a state where a sheet is supported on the discharge tray.

12. The image forming apparatus according to claim 11, wherein the sheet discharge unit includes a movable member movable to a protruded position where the movable member protrudes above the discharge tray and a retracted position where the movable member is retracted below with respect to the protruded position, the movable member being configured to be pushed by a sheet discharged to the discharge tray and moved from the protruded position to the retracted position, and wherein the lock member is configured to move from the lock releasing position to the lock position in an interlocked manner with a movement of the movable member from the protruded position to the retracted position.

13. The image forming apparatus according to claim 12, wherein the sheet discharge unit includes a sheet presence sensor configured to output a detection signal that changes in accordance with a position of the movable member.

14. The image forming apparatus according to claim 11, wherein the sheet discharge unit includes a sensor configured to output a detection signal that changes in accordance with a presence/absence of a sheet supported on the discharge tray or an amount of sheets supported on the discharge tray, and an actuator configured to move the lock member from the lock releasing position to the lock position in a case where the detection signal has changed.

15. An image forming apparatus comprising:

an apparatus body accommodating an image forming unit configured to form an image on a sheet;

an image reading unit disposed above the apparatus body and configured to read an image information, the image reading unit including an opening/closing member movable to a closed position and to an open position above the closed position;

a sheet discharge unit disposed above the apparatus body and configured to discharge a sheet on which an image has been formed by the image forming unit, the sheet discharge unit including a discharge tray configured to support a discharged sheet, the discharge tray being disposed above the opening/closing member, movable to a first position and to a second position above the first position, and configured to move from the first position to the second position when the opening/closing member is moved from the closed position to the open position; and an interlocking mechanism configured to connect the opening/closing member and the discharge tray to operate in an interlocked manner with each other, the interlocking mechanism being configured to transmit force from the opening/closing member to the discharge tray so that the discharge tray moves from the first position to the second position when the opening/closing member is moved from the closed position to the open position.

16. The image forming apparatus according to claim 15, wherein the opening/closing member is configured to pivot about a rotational axis, and wherein, when viewed in a direction of the rotational axis, an area to be occupied by the opening/closing member in a case where the opening/closing member is at the open position and an area to be occupied by the discharge tray in a case where the discharge tray is at the first position overlap.

17. The image forming apparatus according to claim 15, further comprising:

a lock mechanism configured to lock the opening/closing member to restrict a movement of the opening/closing member from the closed position toward the open position.

18. An image forming apparatus comprising:

an apparatus body accommodating an image forming unit configured to form an image on a sheet;

an image reading unit disposed above the apparatus body and configured to read an image information, the image reading unit including an opening/closing member movable to a closed position and to an open position above the closed position; and a sheet discharge unit disposed above the apparatus body and configured to discharge a sheet on which an image has been formed by the image forming unit, the sheet discharge unit including a discharge tray configured to support a discharged sheet, the discharge tray being disposed above the opening/closing member, movable to a first position and to a second position above the first position, and configured to move from the first position to the second position when the opening/closing member is moved from the closed position to the open position, wherein the sheet discharge unit includes a casing that supports the discharge tray, and wherein the discharge tray is configured to move linearly in a direction along a gravity direction with respect to the casing.

19. The image forming apparatus according to claim 18, wherein the opening/closing member is configured to pivot about a rotational axis, and wherein, when viewed in a direction of the rotational axis, an area to be occupied by the opening/closing member in a case where the opening/closing member is at the open position and an area to be occupied by the discharge tray in a case where the discharge tray is at the first position overlap.

20. The image forming apparatus according to claim 18, further comprising:

a lock mechanism configured to lock the opening/closing member to restrict a movement of the opening/closing member from the closed position toward the open position.

* * * * *